United States Patent [19]

Larsen

[11] 3,996,022

[45] Dec. 7, 1976

[54] CONVERSION OF WASTE RUBBER TO FUEL AND OTHER USEFUL PRODUCTS

[75] Inventor: John W. Larsen, Knoxville, Tenn.

[73] Assignee: Tennessee Valley Authority, Muscle Shoals, Ala.

[22] Filed: Jan. 31, 1975

[21] Appl. No.: 546,075

Related U.S. Application Data

[63] Continuation-in-part of Ser. No. 470,862, May 17, 1974.

[52] U.S. Cl. .................... 44/1 D; 44/62; 208/9; 260/711; 423/453
[51] Int. Cl.² .................... C10L 5/48; C10G 1/06
[58] Field of Search .............. 44/1 D, 1 R, 4, 6, 62; 260/2.3, 711; 208/9, 10; 423/453

[56] References Cited

UNITED STATES PATENTS

| | | | |
|---|---|---|---|
| 2,567,802 | 9/1951 | Carr et al. | 260/711 |
| 2,610,925 | 9/1952 | Staten | 260/2.3 X |
| 2,701,268 | 2/1955 | Dasher | 260/711 |
| 3,704,108 | 11/1972 | Alpert | 44/62 |
| 3,736,250 | 5/1973 | Berg et al. | 208/10 |
| 3,790,469 | 2/1974 | Loth et al. | 208/10 |

*Primary Examiner*—Carl F. Dees
*Attorney, Agent, or Firm*—Robert A. Petrusek

[57] ABSTRACT

Heretofore waste rubber, a substantial amount of it in the form of used automobile tires, has been buried, burned, or otherwise disposed of in manners and by means totally inconsistent with good ecological practices and considerations. Now, such waste or scrap rubber, both natural and synthetic, can readily be converted in the presence of molten acidic halide Lewis salt catalysts to useful products, including fuels comprising a naptha-like oil, a burnable solid carbonaceous material, and a mixture of gases. The most promising salts are zinc chloride, tin chloride, and antimony iodide. Also, an extremely active catalyst can be prepared by adding up to about 60 percent by weight of sodium chloride to the zinc chloride catalyst. The burnable carbonaceous material has been shown to be a carbon black of moderate quality and is believed to be suitable for reuse in tires if blended with high-quality fresh carbon black.

7 Claims, No Drawings

CONVERSION OF WASTE RUBBER TO FUEL AND OTHER USEFUL PRODUCTS

The invention herein described may be manufactured and used by or for the Government for governmental purposes without the payment to me of any royalty therefor.

This application is a continuation-in-part of my copending application Ser. No. 470,362, filed May 17, 1974 Now Defensive Publication No. T940,007, for CONVERSION OF WASTE RUBBER TO FUEL AND OTHER USEFUL PRODUCTS.

BACKGROUND OF THE INVENTION

The present invention relates to the conversion into useful products of heretofore considered useless waste and scrap rubber articles, particularly worn-out tires.

The long established prior-art practices for disposal of waste rubber have resulted in substantial pollution and degradation of the environment. Presently, there are in excess of 200 million used automobile tires discarded each year in this country. Even though some efforts have been made to reclaim and recycle small portions of this waste vulcanized rubber material through various methods and means, it is fair to state that currently no real productive uses exist for these discarded tires. Consequently, they are usually simply incinerated or placed in so-called sanitary landfills and even dumped into the oceans allegedly for the purpose of forming artificial barriers and reefs for the purpose of attracting fish. Obviously, these and other prior-art methods of disposal are at best stop-gap measures and cannot be allowed to continue indefinitely. In addition, such practices are indeed wasteful in that they do not go to the heart of the problem of recycling the valuable hydrocarbon values therein either as useful fuel or feedstocks to the petro-chemical industry and at the present time and in the foreseeable future such continuing wasteful practices indeed seem less than desirable, particularly in view of the demand for the likes of oil and natural gas. Accordingly, the potentially valuable hydrocarbon values in such discarded rubber articles would be better utilized if an economically attractive method for transforming them into useful liquid, solid, and/or gaseous hydrocarbon products having utility as fuel and/or as petro-chemical raw materials could be devised.

At the present time, there appear to be three general methods of approaching this desired objective to produce liquid or other fuels from discarded rubber articles such as worn-out automobile tires. One approach to the problem, to wit, the destructive distillation of scrap tires, was studied by the Bureau of Mines in cooperation with a segment of private industries and is reported in Bureau of Mines report No. 7302. In this approach, rubber was heated to temperatures between about 500° and 900° C and the volatile liquids and gases generated were collected. The chief disadvantage of this approach appears to be the amount of time required for the process to generate useful products in that heating times in excess of three hours were required. A second disadvantage to this approach was that the feed to the process was ground-up rubber rather than intact tire carcasses or relatively large "diced" pieces thereof. In another approach to the problem, researchers have attempted to apply oil shale retorting technology to the problem at hand by introducing into retort vessels shredded rubber. They estimate the cost of preparing the shredded rubber at $10.00 per ton. Aside from other disadvantages of this approach, a recent Rubber Manufacturers Association study indicates that the cost of preparing 16-mesh granulated rubber is about $43.00 a ton.

In still another approach to the problem, there is taught in U.S. Pat. No. 3,704,108 (Alpert) the catalytic hydrogenation of scrap tires wherein they ae are in an autoclave reactor under hydrogen pressure ranging between about 500 to 2000 psig and temperatures ranging between about 660° and 850° F. The principal objective of this approach is to recover carbon black from the tires which is intended to be the principal product for sale. However, as it turns out, the resulting carbon black apparently contains sufficient ash that there appears to be no ready market for the principal product of this process. Aside from the relatively high pressures which necessitate an autoclave-type device, the cost of operating the process is also increased by the necessity of hydrogen as feedstock and the fact that expensive shredded rubber must be used.

SUMMARY OF THE INVENTION

The present invention is directed to retrieving from the 200 million plus automobile tires and the like which are annually discarded in this country, a hydrocarbon fuel substitute with a liquid oil equivalent of over 300 million gallons per year to help meet this nation's energy needs and at the same time to improve its physical environment. Additionally, the conversion process herein disclosed also recovers a residual material consisting primarily of carbon black, which may be recycled into new tires, thereby further reducing the demand for natural gas from which carbon black is now made.

These desirable objectives, as well as many others, are obtained in the present invention by means of a process wherein relatively large pieces of scrap rubber including whole tire carcasses are introduced into a preselected molten salt catalyst from the family of Lewis acids at predetermined temperatures, whereby the resulting extremely rapid reaction produces the following three basic products: The first product is a mixture of hydrocarbon gases; the second product is a low-sulfur fuel oil; and the third product is a carbonaceous residue. According to the present invention it has been observed that the amounts of these three products vary with catalyst temperature and conditions. Yields of the oil run as high as 60 percent under conditions that dictate that on a scale of commercial size expectations for the amounts of these products should be 45 percent oil by weight (about 1.5 gallons per tire), 45 percent carbonaceous residue, and about 10 percent gases. The oil product meets the requirements of a No. 2 fuel oil without further treatment. The carbonaceous residue product produces about 14,000 Btu per pound and contains only about 2 percent sulfur, thereby making it usable as a coal substitute as well as a useful product for recycling in tire production. For purposes of operating the process, the heating values in the gaseous product from the present invention are quite sufficient to provide the necessary makeup heat for maintenance and continuance of the reaction, and finally and equally importantly, the present process proceeds rapidly with large pieces of rubber introduced into the catalyst, thereby eliminating the prior-art necessity of grinding or shredding. Thus, a process has been developed which can recover very rapidly the hydrocarbon values of used tire carcasses and the like which operate in a time period of a matter of minutes. If even shorter times are required, or desirable, the reaction proceeds in a matter of seconds on diced pieces of waste rubber.

DESCRIPTION OF THE EMBODIMENTS

It has now been discovered that natural and synthetic waste rubber, particularly scrap rubber from automobile tires, can conveniently and economically be recycled in a process wherefrom can be recovered the desirable liquid, solid, and gaseous products enumerated supra by a method wherein the waste or scrap tires are heated in molten acidic halide salts or Lewis acids at temperatures ranging from about 300° C to the respective boiling points of the individual halide salts wherein results the destruction of the tire and the production of the desirable hydrocarbon oil, solid carbonaceous residue and hydrocarbon gases. Waste or scrap rubber as referred to herein includes natural and synthetic rubber including, for example, neoprenes, butyl rubbers, nitrile rubbers, styrene rubbers, polybutadine, acrylate rubbers, etc. Of the various Lewis acids utilized in the instant process wherein they are effecting a catalytic influence on the scrap tires, zinc chloride and tin chloride are found to be the most desirable.

In the present process, the tire carcasses, or diced portions thereof, depending on the time of reaction required ranging from minutes to seconds, respectively, are introduced into a reactor containing the molten salt catalyst. The construction details of the reactor are not of sufficient importance in that said reactor may be open to the atmosphere and need only be sufficiently strong to withstand the relatively low temperatures of process while at the same time be of a material suitable to contain the catalyst salts. After introduction of the tires into the molten salt catalyst in the reactor they decompose. The oils and gases which distill out are collected and a granular like carbonaceous residue floats on the surface of the melt. The resulting organic vapors so collected are then subsequently fed to a distillation unit and therein separated. The residue floating on the surface of the catalyst is removed with some of the molten salts by any convenient method such as by skimming and are subsequently separated. The catalyst removed in the separation step is then fed to a catalyst recovery unit where the entrained carbon, ammonia, and sulfur are removed and the relatively pure catalyst is returned to the reactor vessel.

EXAMPLES

In order that those skilled in the art may better understand how the present invention can be practiced, the following examples of methods and processes which have been used in the production of the desired products enumerated supra, as well as process conditions such as catalyst temperature, are given by way of illustration and not by way of limitation.

EXAMPLE I

This example illustrates a compilation of data obtained from several different small-scale batch reactors utilizing three different acid halide salts as molten catalysts.

Table I

| Salt (wt g) | Temp. ° C | Wt tires (g) | Wt oil (g) | Wt residue (g) | Wt gas (g) |
|---|---|---|---|---|---|
| SbI$_3$ (10) | 380 | 2.05 | 0.95 | 0.80 | 0.3 |
| ZnCl$_2$ (212) | 500 | 104 | 45 | 47 | 12 |
| SnCl$_2$ (161) | 300 | 85 | 26 | 46 | 13 |
| SnCl$_2$ (23) | 500 | 2.0 | 0.6 | 1.3 | 0.1 |

In these tests, it was found that the reaction proceeds best at temperatures above 300° C. The product mixture changes as a function of temperature and the reaction would be run at a temperature selected to give those products best suited for the end use contemplated. The oils produced are extremely complex mixtures containing at least 28 compounds and are rich in aromatics, a typical analysis being 87.55 percent C, 10.06 percent H, and 0.57 percent S. The heating value is typically 18,300 Btu per pound. A typical analysis of the carbonaceous residue is shown in Table II below.

TABLE II

| Proximate Analysis | |
|---|---|
| Percent total moisture | 0.8 |
| Percent volatile matter (dry) | 24.9 |
| Percent ash (dry) | 8.9 |
| Percent fixed carbon (dry) | 66.2 |
| Percent total sulfur (dry) | 1.9 |
| Btu/lb. | |
| Dry | 13,930 |
| Ash and moisture free | 15,280 |
| Ultimate analysis (dry) | |
| Percent carbon | 82.5 |
| Percent hydrogen | 3.4 |

EXAMPLE II

In this series of tests, initial experiments were carried out in 50-ml distilling flasks with the flasks being charged with the indicated weight shown in Table III infra at room temperature and quickly brought to the indicated temperatures. The total times of reaction are indicated. The oil was collected in test tubes. In addition to the oil, any water in the system is displaced and collected. Residue yields were determined by weighing the reaction flask before and after reaction, with gas yields being determined by the difference.

Several conclusions can be drawn from these runs reported in Table III infra. The first is that the "soft" Lewis acids do catalyze the decomposition of rubber tires. Secondly, the reactions and products therefrom are definitely much cleaner than those obtained by prior-art pyrolysis methods. Finally, an inert salt mixture, LiCl-KCl, serves as an efficient heat transfer medium and noticeably increases the rates of pyrolysis.

TABLE III

| | | Small Scale Reactions | | | | | |
|---|---|---|---|---|---|---|---|
| Run No. | Salt (wt in g) | Wt Tires" (g) | T, ° C max. | Run time (min) | Wt Oil Product(g) | Wt Residue (g) | Wt Gas (g) |
| GTC 32 | SbI$_3$ | | | | | | |

TABLE III-continued

| Run No. | Salt (wt in g) | Small Scale Reactions | | | | | |
|---|---|---|---|---|---|---|---|
| | | Wt Tires[a] (g) | T, °C max. | Run time (min) | Wt Oil Product(g) | Wt Residue (g) | Wt Gas (g) |
| GTC 30 | (10.0) ZnCl$_2$ | 2.05 | 380 | 30 | 0.45[b] | 0.80 | 0.3[c] |
| GTC 28 | (10.8) SnCl$_2$ | 3.35 | 500 | 75 | 1.00[d] | 1.0 | 0.5[e] |
| | (19.2) LiCl | | | | | | |
| | (11.2) KCl | 2.77 | 500 | 120 | 0.74 | 1.8 | 0.1 |
| GTC 26 | (13.8) ZnCl$_2$ | | | | | | |
| | (25) | 2.55 | 500 | 43 | 1.3 | 0.7 | 0.3[f] |
| GTC 24 | None | 2.85 | 450[g] | 60 | 1.3 | 1.1 | 0.5[e] |
| GTC 23 | SnCl$_2$ (23) | 2.0 | 500 | 51 | 0.6 | 1.3] | 0.1 |

[a]Cut in pieces approximately 1½" square and as thick as the tire.
[b]0.5 g H$_2$O collected.
[c]By difference.
[d]0.5 g H$_2$O collected.
[e]Top layer 0.74 g, bottom 1.0 g 0.5 g H$_2$O collected, source unknown.
[f]0.3 g H$_2$O collected
[g]Thermometer inserted into rubber block. Actual temperature probably 100° higher.

EXAMLE III

In this series of tests, the operation of the tin chloride and zinc chloride catalysts was scaled up somewhat to obtain more product for analysis as well as for other obvious considerations. Triple-neck flasks were used as the reaction vessels, and two general procedures were tried. In the first procedure (A), the flask was charged with a salt and inch-size square pieces of tire at room temperature. This was then heated to the reaction temperature without stirring and the oil distilled out. The temperature of the hydrocarbon vapors and of the salt were monitored continuously. In the second procedure (B) the salt was heated to reaction temperature and pieces of rubber were introduced into the flasks. The reaction was stirred and both the salt and vapor temperatures were recorded. Results are presented in Table IV infra. It is apparent from the data in this example that the yields are highest using zinc chloride and adding the tire to the hot salt. A yield of oil of over 43 percent was achieved. This yield appears typical although yields as high as 60 percent have been obtained in some cases. The yield using this procedure with tin chloride was only 37 percent. The gas yields were comparable-12 percent for zinc chloride and 14 percent for tin chloride. It appears that the rubber reacts much faster with the tin chloride system.

of 2-inch-square pieces of scrap rubber from automobile tires into molten zinc chloride results in the rapid destruction of the rubber and the formation of three products. They are hydrocarbon gases, a highly aromatic oil, and a carbonaceous residue. The relative amounts of the three materials vary with conditions and temperature, but at 500° C in 1-liter flasks the weight percentages are gas 15 percent, oil 40 to 45 percent, and residue 40 to 45 percent. The oil yields are much higher in smaller reactors, the decreased yield probably being due to increased polymerization with larger residence times in the larger reactor.

The data in Table V infra show the results of the introduction of successive 50-gram samples of rubber into the flasks. The data in Table V are for the run in ZnCl$_2$ which shows the lowest conversion to oil observed. A number of points are worth noting. No precautions are taken to keep the system dry; it is open to the air. The rubber pieces react rapidly, being completely decomposed in about 15 minutes. The first rubber to react displaces water of hydration from the catalyst, the later oil samples contain only a little water whose source is uncertain, perhaps from the cord material in the tire. The catalyst maintains its activity during the reaction of successive amounts of rubber. This run used 134 grams of ZnDl$_2$. The process is a simple one; the rubber is dropped into the molten ZnCl$_2$—it de-

| Run No. | GTC 33 | GTC 31 | GTC 24 | GTC 27 |
|---|---|---|---|---|
| Salt (wt in g) | ZnCl$_2$ (212) | SnCl$_2$ (161) | SnCl$_2$ (259) | ZnCl$_2$ (262) |
| Wt. tire (g) | 104 | 94 | 157 | 176 |
| T. °C max. | 500 | 300 | 500 | 500 |
| Run time (min) | 92 | 126 | 164 | 125 |
| Wt. oil (g) | 36.7 | 25.8 | 14.8 | 39.4 |
| | 8.4 | 9.1 | 2.0 | 8.7 |
| Wt. residue (g) | 47 | 46 | 124 | 127 |
| Wt. gas (g) | 12.2 | 13 | 16 | 2 |
| Procedure | B | B | A | A |
| Chemical Formula of oil | | | CH$_{1.58}$S .003 | CH$_{1.4}$S .002 |
| | | | H$_2$O | CH$_{1.0}$S .004 |

EXAMPLE IV

In another series of tests performed on laboratory to small bench scale, it was observed that the introduction composes and the oil and gases distill out. The carbonaceous residue floats on the pool of catalyst and can be skimmed off or removed by filtration.

The compositions of the resulting products are of great interest. The gas consists of $C_1$-$C_4$ hydrocarbons and is a clean, useful fuel, 81 percent boils between 50° and 350° C (see Table VI, infra). It contains a significant amount (at least 25 percent) of alkyl aromatics and is useful directly as obtained as No. 2 fuel oil. However, it may be more valuable as a source of aromatics. The aromatics would be removed by distillation and the other hydrocarbons sold as fuel. The carbonaceous residue (see Table VII infra) has a heating value greater than that of coal and could be sold as fuel. However, there is a significant possibility that this material could be used to replace some of the carbon black in tires. This would give it a value of about 6 cents per pound.

The solid produced has a heat value intermediate between coal and oil. A spectrographic analysis of the ash showed traces of several common metals, but indicated that it is mostly zinc oxide and silica.

In all of these cases, a piece of rubber 1 × 1½ × ½ inch reacts completely in less than 5 minutes of its introduction into the catalyst, though the rate is variable and depends on the catalyst system. Whole tire carcasses will require up to about 90 minutes depending on rubber formulation, etc. Tin chloride is particularly effective, the rubber being destroyed in about a minute.

Table V

Products from Successive Introductions of Rubber Into the Same Catalyst

| Sample No. | Rubber wt. (g) | Oil wt. (g) | Wt. $H_2O$ in oil (g) | Residue wt. (g) | Gas wt. (g) |
|---|---|---|---|---|---|
| 1 | 51.45 | 16.48 | 5.35 | | |
| 2 | 51.00 | 20.45 | 2.95 | | |
| 3 | 50.35 | 20.40 | 3.75 | | |
| 4 | 51.00 | 23.40 | 2.18 | | |
| Total | 203.80 | 81.18 | 14.23 | 79.6 | 43.1 |

Table VI

Typical Oil Analysis

| Sample GTC-27 | 87.55 | 10.067 H | 0.57 percent S |
|---|---|---|---|
| Heating value | 18,340 Btu/pound | | |

Table VII

| Carbonaceous Residues | |
|---|---|
| Sample No. | GTC-27 |
| Laboratory No. | C73-2664 |
| Proximate Analysis | |
| Percent total moisture | 0.8 |
| Percent volatile matter (dry) | 24.9 |
| Percent ash (dry) | 8.9 |

Table VII-continued

| Carbonaceous Residues | |
|---|---|
| Percent fixed carbon (dry) | 66.2 |
| Percent total sulfur (dry) | 1.9 |
| Btu/lb. | |
| Dry | 13930 |
| Ash and moisture free | 15280 |
| Ultimate analysis (dry) | |
| Percent carbon | 82.5 |
| Percent hydrogen | 3.4 |

The sample has a heat value intermediate between coal and oil. A spectrographic analysis of the ash showed traces of several common metals, but indicated that it is mostly zinc oxide and silica.

EXAMPLE V

From previous tests reported infra, as well as from other data acquired during reduction to practice of the present invention, an energy balance for the instant process has been formulated and is presented below:

ENERGY BALANCE
Energy Values (Btu) For One Tire

| | Present | | Proposed | |
|---|---|---|---|---|
| Collection | −9,300 Btu | Collection | −14,000 Btu | |
| Processing | −325,000 Btu - disposed | Processing | 90,000 Btu - | Plant energy use - Gas produced by reaction |
| | | | −90,000 | |
| | | | 183,400 Btu - | Oil produced (8.825 lb) |
| | | | +156,750 Btu - | Residue (11.25 lb) |
| Net energy | −334,300 Btu/tire | | 340,100 Btu/tire | |

An energy balance is computed for present energy values of rubber tires under existing collection and disposal practices.

Proposed energy value assignments represent energy values of rubber tires under the proposed collection and chemical processing system advocated by this submission.

For computation purposes, collection energy values were based upon the assumption that tires were collected in lots of 200 tires per load of 5,000 loads with a round-trip average of 66.6 miles per trip or one-third mile per tire transported. The proposed collection values were computed upon the same basis but using a slightly higher factor of 100 miles per trip or one-half mile per tire transported.

Energy values for the proposed processing are based upon the zinc-chloride catalyst reaction of the two catalyst reactions possible. Energy values for the chemical reactions were computed based upon laboratory reactions of smaller quantities. Additional explanation of the processing values and assumptions in computing energy collection values are as follows:

An approximate energy balance can be calculated for the chemical reactions involved in this process using the heats of combustion of tires and of the products. Since the products are different using $SnCl_2$ and $ZnCl_2$ they must be treated individually.

---

10 lb tires  $\xrightarrow{SnCl_2}$  2.75 lb oil  +  4.92 lb residue  +  1.4 lb gas 130,000 Btu         50,400 Btu        46,500 Btu            31,000 Btu Products −Reactants = 127,900 −130,000 = 2,100 Btu

---

The reaction is exothermic by ca 210 Btu/lb and this much heat would have to be removed from the reaction.

---

10 lb tires  $\xrightarrow{ZnCl_2}$  4.0 lb oil  +  4.5 lb residue  +  1.5 lb gas 130,000 Btu         73,360 Btu        62,700               33,125

Products −Reactants = 153,940 −130,000 = +23,940 Btu

---

The reaction is endothermic and ca 2400 Btu/lb would have to be supplied. This amount of heat is derivable from the gas produced.

A number of assumptions were made in the above calculations. The heat of combustion of oil resulting from a $SnCl_2$ catalyzed process was used for both oils. Since their nmr spectra are nearly identical, this is not unreasonable. It was assumed that the gas produced was ethane. Actually it is a mixture, but its heat of combustion should be approximately that of ethane. More recent literature gives the heat of combustion of tires as 18,000 Btu/lb. Using this value, both processes are exothermic and all the gas produced could be sold.

COLLECTION ASSUMPTIONS

1. One million tires annually are disposed of within a 65-mile radius of the proposed plant site. Half of these are within a 25-mile radius of the proposed plant site.
2. Average tire weight = 25 pounds.
3. One pound of gasoline = 20,000 Btu.
4. One pound of tire = 13,000 Btu
5. One gallon of gasoline = 7 pounds
6. Five-miles-per-gallon gasoline consumption by collection trucks.
7. The energy balance values are computed for tires at the point for which no further productive use is intended, which is assumed to be the disposal point.

EXAMPLE VI

In the earlier work on the present invention, as reflected in the specification up to the present example, the black residue was thought of as a burnable material compatible with coal and having a heating value slightly greater than coal. In Example IV supra, the possibility was raised that the solid residue might be useful as a substitute for some of the carbon black used in the construction of new tires. Subsequently, tests performed by one of the larger tire manufacturers were made on the residue from the instant process and it is now reported that this solid residue is a carbon black of moderate quality. It has also been reported that this material will be suitable for reuse in tires if blended with some quantities of high-quality fresh carbon black. Since carbon black is currently selling for about 10 cents a pound, this means that the product of the instant process which was priced as coal in the earlier work now proves to be the most valuable of the three products produced by the present invention.

In subsequent work on the present process, several modifications to the catalyst system have been tried, one of which shows a great deal of promise, to wit, a very active catalyst can be prepared by adding up to about 60 percent by weight NaCl to the zinc chloride. A 75-percent NaCl — 25-percent $ZnCl_2$ catalyst has too high a melting point to be useful. Some of the results of these tests are shown in Table VIII infra. As a result of these tests, it may be possible to develop a system which will obviate the need to recycle catalyst by converting the ZnO in tires to $ZnCl_2$ and adding an inexpensive salt such as NaCl to obtain the necessary volume. In such a system, the catalyst would be withdrawn and processed to recover the zinc.

Also shown in Table VIII below is the data from a preliminary trial run on polyethylene.

Table VIII

| Catalyst | NaCl | 19.41 g | 111.65 g | 135.3 g | 21.2 g | KCl | 118.73 | 0 |
|---|---|---|---|---|---|---|---|---|
| | $ZnCl_2$ | 213.55 g | 111.65 g | 90.2 g | 6.8 g | LiCl | 101.27 | 16.90 g |
| | | 8.3% Wt NaCl | 50% Wt NaCl | 60% Wt. NaCl | 75% Wt NaCl | 40% | mole KCl | 100% $ZnCl_2$ |
| Reaction Time | | 3 hrs | 2 hrs 50 mins | 3 hrs | does not melt at 550° C | | 3 hrs | 40 mins. |
| Reaction Temperature ° C (highest) | | 530° C | 530° C | 530° C | | | 500° C | 500° C |
| Weight of tire (g) | | 143.09 g | 110.1 g | 115.95 g | | | 108.6 g | Polyethylene 4.75 g |
| Weight of oil[1] | | 62.58 g | 44.78 g | 43.75 g | | | 51.6 g | 3.7 g |
| Percent yield | | 44 | 40.6 | 38 | | | 47.5 | 78 |
| Weight of gas | | 24.11 g | 14.52 g | 13.4 g | | | 11.25 g | 0.5 g |
| Percent yield | | 17 | 13.1 | 12 | | | 10 | 10.5 |

[1]Before filtration and separation.

While I have shown and described particular embodiments of my invention, modifications and variations thereof will occur to those skilled in the art. I wish it to be understood, therefore, that the appended claims are intended to cover such modifications and variations that are within the true scope and spirit of the invention.

What I claim as new and desire to secure by letters patent is as follows:

1. A process for converting waste solid rubber scrap including used vehicle tires and the like to useful liquid, solid, and gaseous chemicals which consists essentially of:
   a. heating at substantially atmospheric pressure a molten acidic halide Lewis salt selected from the group consisting of zinc chloride, tin chloride, antimony iodide, and mixtures thereof, to a temperature range from about 300° C to the respective boiling point of said salt, thereby converting same to a molten state;
   b. introducing into said heated molten salt solid waste rubber material for a predetermined time;
   c. removing from above the surface of said molten salt the resulting distilled gaseous and liquid products;
   d. removing from the surface of said molten salt at least a portion of the resulting carbonaceous residue formed thereon together with at least a portion of said molten salt to separating means wherefrom is recovered as a solid product, said solid carbonaceous material, and wherefrom is recycled back to said molten salt substantially all of the salt material removed therefrom.

2. The process of claim 1 wherein said molten salt is zinc chloride.

3. The process of claim 1 wherein the molten salt is tin chloride.

4. The process of claim 1 wherein the molten salt is antimony iodide.

5. The process of claim 1 wherein the temperature ranges from about 300° to about 500° C.

6. The process of claim 1 wherein the residence time of said waste rubber material in contact with said molten salt ranges from about 1 to about 90 minutes.

7. The process of claim 6 wherein said residence time ranges from about 1 to about 15 minutes.

* * * * *